(12) United States Patent
Yamaguchi

(10) Patent No.: US 6,421,103 B2
(45) Date of Patent: Jul. 16, 2002

(54) LIQUID-CRYSTAL DISPLAY APPARATUS INCLUDING A BACKLIGHT SECTION USING COLLIMATING PLATE

(75) Inventor: Akira Yamaguchi, Kanagawa (JP)

(73) Assignee: Fuji Photo Film Co., Ltd., Kanagawa ( * ) Notice: Subject to any disclaimer, the term of this patent is extended or adjusted under 35 U.S.C. 154(b) by 7 days.

(21) Appl. No.: 09/749,658

(22) Filed: Dec. 28, 2000

(30) Foreign Application Priority Data

Dec. 28, 1999 (JP) .......................................... 11-373750

(51) Int. Cl.⁷ ............................................ G02F 1/1335
(52) U.S. Cl. ............................ 349/61; 349/64; 349/66; 349/113
(58) Field of Search .............................. 349/61, 62, 65, 349/66, 113, 69; 362/558, 561

(56) References Cited

U.S. PATENT DOCUMENTS 5,570,210 A * 10/1996 Yoshida et al. ................ 349/62
5,982,529 A * 11/1999 Chapnik et al. ............... 349/3
6,118,503 A * 9/2000 Oki et al. ...................... 349/65
6,219,111 B1 * 4/2001 Fukuda et al. ................. 349/5

FOREIGN PATENT DOCUMENTS

JP 5-333202 12/1993 ............ G02B/5/02
JP 7-5306 1/1995 ............ G02B/5/02

* cited by examiner

Primary Examiner—William L. Sikes
Assistant Examiner—Tarifur R. Chowdhury
(74) Attorney, Agent, or Firm—Sughrue Mion, PLLC

(57) ABSTRACT

The improved liquid-crystal display apparatus has a liquid-crystal display panel, a backlight section that issues collimated light launched and a light diffusing plate and satisfies either the relation $p/\tan\theta \leq L$ or $d \times \tan\theta \leq A$, or the both relations, where p is the average pitch of emergence of the collimated light, θ is the divergence angle of the collimated light, L is the distance from the collimating plate to the interface in the liquid-crystal layer of the liquid-crystal display panel which is directed to the collimating plate, d is the distance from the light diffusing plate to the interface in the liquid-crystal layer of the liquid-crystal display panel which is directed to the light diffusing plate, and A is the pixel size of the liquid-crystal display panel. The apparatus can display images of high contrast and quality over a wide range of viewing angles without having unevenness and blur.

15 Claims, 2 Drawing Sheets

LIQUID-CRYSTAL DISPLAY APPARATUS INCLUDING A BACKLIGHT SECTION USING COLLIMATING PLATE

BACKGROUND OF THE INVENTION

This invention relates to the technology of liquid-crystal display apparatus, more particularly, to a liquid-crystal display apparatus capable of producing high-contrast image over a wide range of viewing angles.

The use of liquid-crystal displays (LCDS) as a display for word processors and computers is rapidly increasing today. The use of LCDs as a monitor in ultrasonic, CT and MRI diagnostic apparatus is under review. Conventionally, these medical diagnostic apparatus have primarily used CRT-s (cathode-ray tubes) as a monitor.

LCDs have many advantages such as ease in size reduction, small thickness and lightweightness. On the other hand, they have poor viewing angle characteristics (narrow viewing angle) since as the viewing direction or angle changes, the contrast of an image decreases sharply and the gradation also reverses to have the image look differently. As a result, depending on the position of the viewer, the image cannot be viewed correctly.

In the medical applications described above, correct viewing of images is important particularly for preventing wrong diagnosis. What is more, diagnosis based on the difference in image density requires that images of high contrast ratio be displayed over a wide range of viewing angles. Another problem peculiar to medical monitors is that image is usually displayed in monochrome (black and white colors) and, hence, suffers considerable drop in contrast as the viewing angle varies.

A known method for increasing the viewing angle of LCDs relies upon using collimated backlight and the image-bearing light that has passed through the liquid-crystal display panel is diffused with a diffusing plate. This method increases the viewing angle of the liquid-crystal display panel and enables the fabrication of an LCD that produces high-contrast image display over a wide range of viewing angles.

A problem with this method is that uneven display or blurred image may occur if the collimated light and the liquid-crystal display panel do not match in characteristics. For example, if the average pitch of outgoing collimated light is larger than the pixel size of the liquid-crystal display panel, the backlight is incident in different quantities on the pixels of the liquid-crystal display panel, producing unevenness in the image being displayed.

Since incorrect recognition of an image can cause wrong diagnosis or inconsistency in the results of diagnosis, uneven display and blurred image are particularly serious problems in the medical applications.

SUMMARY OF THE INVENTION

The present invention has been accomplished under these circumstances and has as an object providing a liquid-crystal display apparatus that uses collimated backlight in combination with a light diffusing plate in order to display high-contrast image over a wide range of viewing angles and which yet can display high-quality image without unevenness and blur that would otherwise result from a mismatch between the characteristics of collimated light and the liquid-crystal display panel adapted to have an increased range of viewing angles.

In short, by using the liquid-crystal display apparatus of the invention, high-quality images that are free from unevenness and blurring can be displayed with high contrast over a wide range of viewing angles.

In order to attain the object described above, the first aspect of the present invention provides a liquid-crystal display apparatus having a liquid-crystal display panel and a backlight section that uses a collimating plate to have collimated light launched into the liquid-crystal display panel, the apparatus satisfying the following relation:

$$p/\tan\theta \leq L$$

where p is an average pitch of emergence of the collimated light, θ is a divergence angle of the collimated light, and L is a distance from the collimating plate to an interface in a liquid-crystal layer of the liquid-crystal display panel which is directed to the collimating plate.

The second aspect of the present invention provides a liquid-crystal display apparatus having a liquid-crystal display panel, a backlight section that uses a collimating plate to have collimated light launched into the liquid-crystal display panel and a light diffusing plate that diffuses the image-bearing light that has passed through the liquid-crystal display panel, the apparatus satisfying the following relation:

$$d \times \tan\theta \leq A$$

where θ is a divergence angle of the collimated light, d is a distance from the light diffusing plate to an interface in a liquid-crystal layer of the liquid-crystal display panel which is directed to the light diffusing plate, and A is a pixel size of the liquid-crystal display panel.

The third aspect of the present invention provides a liquid-crystal display apparatus having a liquid-crystal display panel, a backlight section that uses a collimating plate to have collimated light launched into the liquid-crystal display panel and a light diffusing plate that diffuses the image-bearing light that has passed through the liquid-crystal display panel, the apparatus satisfying the following relations:

$$p/\tan\theta \leq L$$

$$d \times \tan\theta \leq A$$

where p is an average pitch of emergence of the collimated light, θ is a divergence angle of the collimated light, L is a distance from the collimating plate to an interface in a liquid-crystal layer of the liquid-crystal display panel which is directed to the collimating plate, d is a distance from the light diffusing plate to the interface in the liquid-crystal layer of the liquid-crystal display panel which is directed to the light diffusing plate, and A is a pixel size of the liquid-crystal display panel.

In the liquid-crystal display apparatus according to each aspect of the present invention, it is preferable that the backlight section has not only the collimating plate but also a light source and a lamp housing for accommodating the light source an inner surface of which is covered with a diffuse reflecting layer, and the collimating plate has a lens substrate, a multiple of lenses that are supported on the lens substrate for collimating incident light, a diffuse reflecting layer that is formed over the lens substrate except in light entrance areas that align with an optical axes of the lenses, and a shield layer that is formed over the lens substrate on a [0ax3]ide closer to the lenses than the diffuse reflecting layer except in the light entrance areas.

It is also preferable that the pixel size of the liquid-crystal display panel is no more than 200 μm.

It is another preferable that the collimated light has a divergence angle θ of no more than ±10°.

It is further preferable that the liquid-crystal display panel is monochromatic.

DESCRIPTION OF THE PREFERRED EMBODIMENT

We now describe the liquid-crystal display apparatus of the invention in detail with reference to the preferred embodiment depicted in the attached drawings.

Figure 1:
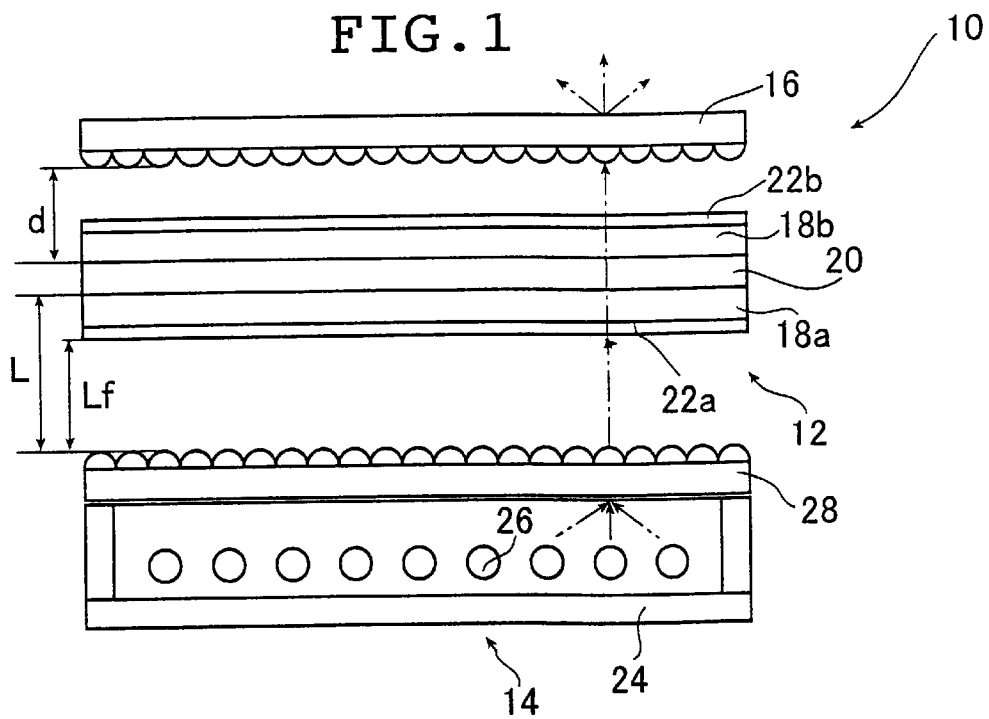
FIG. 1 shows the liquid-crystal display apparatus of the invention in conceptual form.

FIG. 1 shows an example of the liquid-crystal display apparatus of the invention in conceptual form. The liquid-crystal display apparatus generally indicated by 10 in FIG. 1 is a so-called liquid-crystal display (hereunder referred to as LCD) that utilizes a liquid-crystal display panel 12 as an image display means. It is composed of the liquid-crystal display panel 12, a light diffusing plate 16 that diffuses the image-bearing light that has passed through the liquid-crystal display panel 12, and a backlight section 14 that causes collimated light to be incident on the liquid-crystal display panel 12.

In the illustrated case, the liquid-crystal display panel 12 is connected to its driver (not shown). The display apparatus 10 of the invention is combined with any necessary members that are included in known LCDs, such as a casing that has an image viewing window and which holds the backlight section 14, liquid-crystal display panel 12, light diffusing plate 16, the driver and other members in position.

As in the conventional transmission LCD, the collimated light issued from the backlight section 14 is launched into the liquid-crystal display panel 12 being driven in accordance with the image to be displayed and as it passes through the panel 12, the collimated backlight bears the image and is diffused by the diffusing plate 16 to produce image display.

In the display apparatus 10 of the invention, the liquid-crystal display panel 12 (hereunder referred to simply as the display panel 12) may be a known liquid-crystal display panel used in various kinds of LCDs. In the illustrated case, the display panel 12 has a liquid-crystal layer 20 sandwiched between two glass substrates 18a and 18b, with a polarizer plate 22a (or 22b) provided on the face of the glass substrate 18a (or 18b) away from the liquid-crystal layer 20. Various kinds of optical compensating filters (e.g. a phase compensating film) and the like may optionally be provided between the glass substrate 18 and the polarizer plate 22.

The display panel 12 may therefore be of a full-color or monochromatic type and has no limitations on the type of liquid crystal, liquid-crystal cell, drive means (switching device) such as a TFF (thin-film transistor) and black matrix (BM).

The display panel 12 may be operated in all known modes including a TN (twisted nematic) mode, an STN (supertwisted nematic) mode, an ECB (electrically controlled birefringence) mode, an IPS (in-plane switching) mode and an MVA (multi-domain vertical alignment) mode.

In order that the display apparatus of the invention. is also suitable for use as a medical monitor, the pixel size of the display panel 12 is preferably no more than 200 μm, assuming that one pixel in the invention is made up of. R, G and B sub-pixels if the apparatus is of a full-color type. Preferably, the display panel 12 is monochromatic.

The backlight section 14 is a backlight for enabling the viewing of the image being displayed by display panel 12. To issue collimated light, the backlight section 14 comprises a housing 24, light sources 26 and a collimating plate 28.

The housing 24 is a rectangular enclosure with one side open and, in a preferred embodiment, its inner surfaces are covered with a diffuse reflecting layer that reflects the incident light by diffusion. This design allows for efficient use of the light from the light sources 26 to produce intense collimated light. The diffuse reflecting layer is not limited in any particular way and any known type can be used as exemplified by one that is formed of a dispersion of the fine particles of light diffusing materials such as alumina ($Al_2O_3$) and titanium oxide ($TiO_2$)

The housing 24 has the light sources 26 in its interior. All known types of light sources that are used in the so-called transmission LCDs can be used as the light sources 26 as long as they emit adequate quantities of light.

The collimating plate 28 condenses the light issued from the light sources 26, as well as the light reflected by the inner surfaces of the housing 24 and it emits collimated light. Having this capability, the collimating plate 28 is placed to close the opening of the housing 24.

The collimating plate to be used in the invention is not limited in any particular way and various known types of collimating plates may be used, as exemplified by a collimating plate consisting of two crossed Fresnel lenses and a collimating plate using a louver that transmits only part of scattered light.

Figure 2:
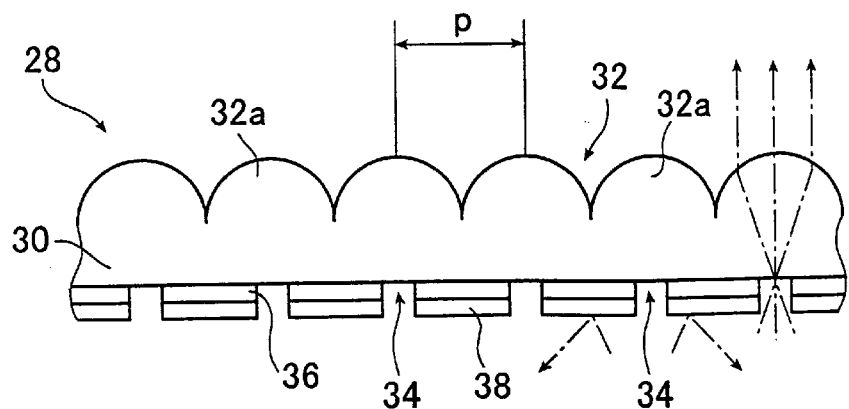
FIG. 2 shows in conceptual form the collimating plate used in the liquid-crystal display apparatus of FIG. 1.

A preferred example of the collimating plate 28 is shown schematically in FIG. 2. It comprises a lens substrate 30 in plate form having a microlens array 32 (hereunder referred to as a lens array 32) formed on one side as a two-dimensional arrangement of hemispherical microlenses 32a. The side of the lens substrate 30 away from the lens array 32 is entirely covered with a light shield layer 36 except in light entrance areas 34 that are set on-axis or in alignment with the optical axes of the microlenses 32a. The side of the lens substrate 30 which is closer to the incoming light than the shield layer 36 (which in the illustrated case is on top of the shield layer 36 with the lens substrate 30 taken as a base) is entirely covered with a diffuse reflecting layer 38 except in the light entrance areas 34.

As is clear from FIGS. 1 and 2, the collimating plate 28 is fixed on the housing 24 with the lens array side facing the display panel 12.

The light emerging from the housing 24 as indicated by the one-long-one-short dashed lines in FIG. 2 is launched into the lens substrate 30 via the light entrance areas 34, passes through it to be launched into the microlenses 32a, refracted and emitted as collimated light.

The light incident other than in the light entrance areas 34 is reflected by the diffuse reflecting layer 38 to go back into the housing 24, where it is reflected to make another entry into the collimating plate 28, thus increasing the efficiency of light utilization. Any light passing through the diffuse reflecting layer 38 is blocked by the shield layer 36 and no stray light will occur that can reduce the directivity of the collimated light.

The constituent materials of the lens substrate 30 and the lens array 32 in the collimating plate 28 are not limited in any particular way and various kinds of lens materials may be used as exemplified by glass and various optical resins. The lens substrate 30 and the lens array 32 may be molded monolithically or they may be separate members that are fixed in combination.

The microlenses 32a need not be hemispherical and they may advantageously take on a shape produced by cutting an ellipsoid (of revolution) through a plane perpendicular to its major axis.

The diffuse reflecting layer 38 and the shield layer 36 also are not limited in any particular way and various known types may be used. For example, the diffuse reflecting layer 38 may be made of the same material as exemplified for the inner surfaces of the housing 24 and the shield layer 36 may be made of chromium (Cr) which is used in the BM of the display panel 12.

The methods of forming the diffuse reflecting layer 38 and the shield layer 36 are not limited, either, and they may be formed by any known methods such as thin-film forming techniques (e.g. vapor deposition) and printing, the choice of which depends on constituent materials and other factors.

Another preferred example of the collimating plate 28 is one that replaces the hemispherical microlenses 32a with a number of light-transmissive spherical beads that are fixed in one layer on a transparent base sheet in such a way that they partly contact the base sheet.

As is well known, collimators cannot convert diffuse light into perfectly collimated light and the collimated light generally has a certain degree of divergence. The collimating plate 28 used in the display apparatus 10 of the invention is preferably of a type that can emit collimated light having a divergence angle $\theta$ of no more than $\pm 10°$ and using this collimating plate, the display apparatus 10 can provide a wider range of viewing angles.

For the purposes of the present invention, the divergence angle $\theta$ is defined by the half-peak width of the directional characteristics of collimated light. More specifically, the divergence angle $\theta$ is the angle the optical axis forms with the position where the quantity of light from the optical axis is halved.

As already mentioned, the collimated light issued from the backlight section 14 is launched into the display panel 12 being driven in accordance with the image to be displayed and as it passes through the panel 12, the collimated backlight bears the image and is diffused by the diffusing plate 16 to produce image display to the viewer. It has also been mentioned that one can increase the range of viewing angles of an LCD by using collimated backlight and diffusing the image-bearing light from the display panel 12 by means of the light diffusing plate 16.

The light diffusing plate 16 to be used in the display apparatus 10 of the invention is not limited in particular way and various known types of light diffusing plates (sheets) can be used, as exemplified by a light diffusing plate having a transparent electroconductive layer between a transparent base and a light diffusing layer and which is disclosed in Unexamined Published Japanese Patent Application (kokai) No. 333202/1993, and a light diffusing plate in which a layer of crosslinked ion-conductive resin having a cationic quaternary ammonium base at side chains is provided between a transparent base and a light diffusing layer, as disclosed in Unexamined Published Japanese Patent Application No. 5306/1995.

Figure 3:
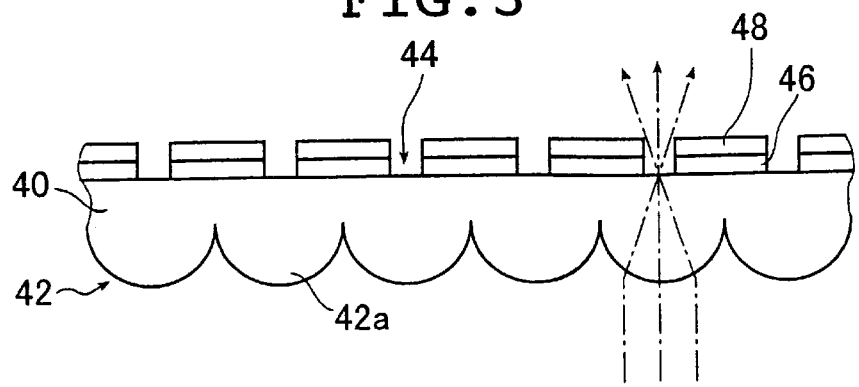
FIG. 3 shows in conceptual form the light diffusing plate used in the liquid-crystal display apparatus of FIG. 1.

In a preferred embodiment, the illustrated display apparatus 10 uses a light diffusing plate 16 shown schematically in FIG. 3. It comprises a lens substrate 40 in plate form having a microlens array 42 (hereunder referred to as a lens array 42) formed on one side as a two-dimensional arrangement of hemispherical microlenses 42a. The side of the lens substrate 40 away from the lens array 42 is entirely covered with a light shield layer 46 except in light exit areas 44 that are set on-axis or in alignment with the optical axes of the microlenses 42a. The side of the lens substrate 40 which is closer to the viewer's eyes than the shield layer 46 is entirely covered with an anti-reflection (AR) layer 48 except in the light exit areas 44.

As is clear from FIGS. 2 and 3, the light diffusing plate 16 has basically the same construction as the aforementioned collimating plate 28 except that the diffuse reflecting layer 36 is replaced by the anti-reflection layer 48.

The light diffusing plate 16 is fixed on the housing with the lens array side facing the display panel 12. The light diffusing plate 16 works in a way just opposite to the aforementioned collimating plate 12; the image-bearing collimated light emerging from the display panel 12 is launched into the microlenses 42a, where it is diffused by refraction and thence issued from the light exit areas 44 as diffused light. Any stray light that is incident other than in the light exit areas 44 is blocked by the shield layer 46 and there will be no interference with image viewing.

FIG. 3 shows a preferred case where the anti-reflection layer 48 is formed on the viewing side of the light diffusing plate 16 and this ensures the viewing of satisfactory image. The anti-reflection layer 48 is not limited in any particular way and various known types of anti-reflection layer can be used.

Figure 4A:
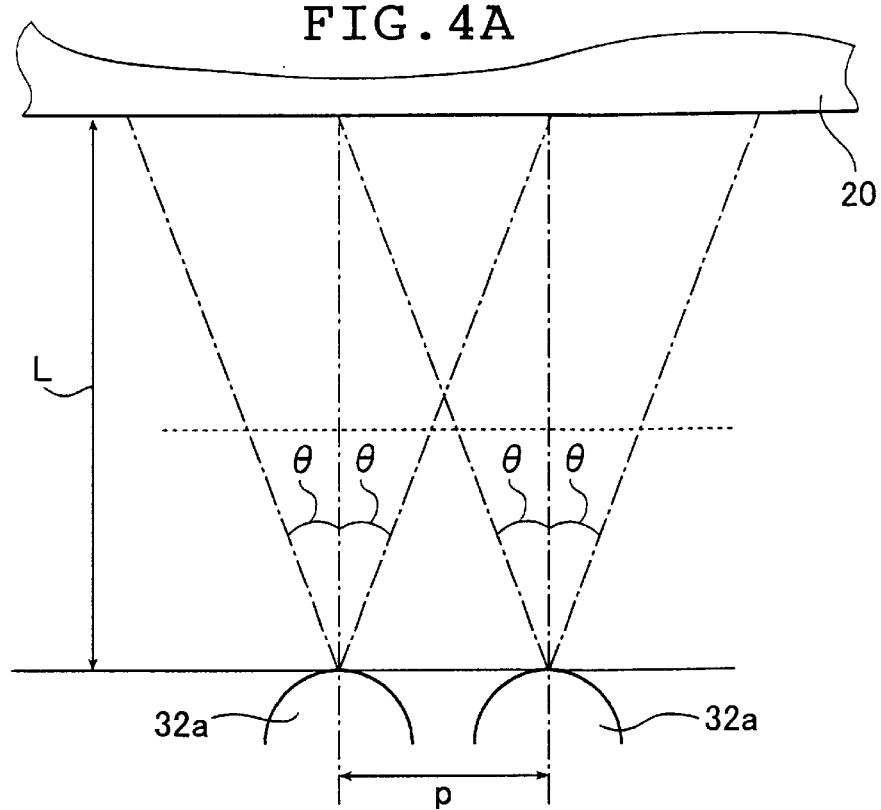
FIGS. 4A and 4B are conceptual diagrams for illustrating the liquid-crystal display apparatus of the invention.
Figure 4B:
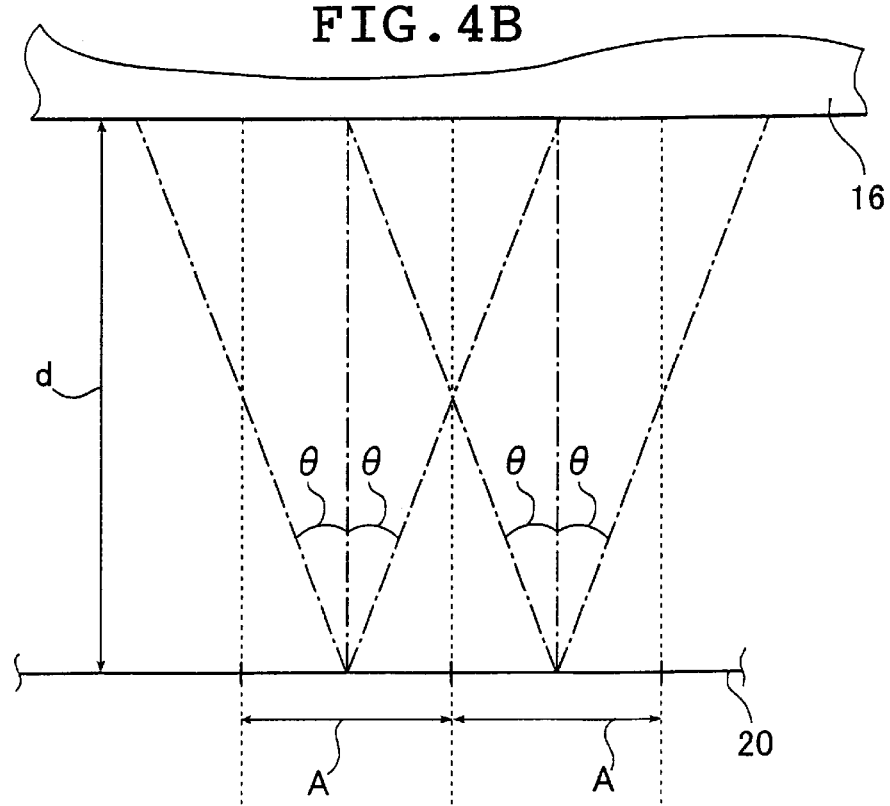

Various parameters of the display apparatus 10 of the invention are shown schematically in FIGS. 4A and 4B. if the average pitch of emergence of collimated light from the collimating plate 12 (which in the illustrated case is the distance between the optical axes of adjacent microlenses 32a) is written as p, the divergence angle of the collimated light as $\theta$, the distance from the collimating plate 12 (the surface of-the microlens array 32) to the interface in the liquid-crystal layer 20 which is directed to the collimating plate 12 (i.e., the interface with the glass substrate 18a) as L, the distance from the light diffusing plate 16 (the surface of the microlens array 32) to the interface in the liquid-crystal layer 20 which is directed to the light diffusing plate 16 (i.e., the interface with the glass substrate 18b) as d, and the pixel size of the display panel 12 as A, the collimated light, collimating plate 28 and display panel 12 satisfy the relation p/tan $\theta \leq L$ and the collimated light, display panel 12 and light diffusing plate 16 satisfy the relation d $\times$tan $\theta \leq A$.

As mentioned earlier, no collimators can produce perfectly parallel light and any collimated light has a certain divergence angle $\theta$ that varies with the performance of the collimator; in other words, its quantity is distributed from the optical axis outward.

In the conventional LCD using collimated backlight, the liquid-crystal layer 20 is typically located in the position indicated by the dashed line in FIG. 4A. As a result, the image being displayed is adversely affected by the distribution (unevenness) in the quantity of collimated light and uneven display occurs. Particularly in the case where the pitch p of the collimated light is greater than the pixel size A of the display panel, the unevenness in the quantity of collimated light appears directly in the displayed image to produce an uneven display.

According to the study of the present inventors, if the liquid-crystal layer 20 is located in such a position that neighboring beams of the incident collimated light overlap each other by an amount at least equal to one half the pitch p (see FIG. 4A), the collimated light incident on the liquid-crystal layer 20 is averaged to eliminate any unevenness in quantity and, hence, the resulting unevenness in display is prevented to ensure the display of a high-quality image.

In the present invention, the collimated light, collimating plate 28 and display panel 12 (liquid-crystal layer 20) satisfy the relation p/tan θ≦L and given this design, adjacent beams of the collimated light incident on the liquid-crystal layer 20 overlap each other by an amount at least equal to one half the pitch p and, as a result, a high-quality image can be displayed without any unevenness.

In an exemplary case, if the collimated light has a divergence angle θ of 10° and the pitch p between adjacent emerging beams is 600 μm, the distance L may be adjusted to 3.4 mm or more.

In its preferred embodiment, the invention also satisfies the relation p/tan θ≦Lf, where Lf is the distance between the collimating plate 28 and the outermost surface of the display panel 12 which faces the collimating plate 28 (which in the illustrated case is the side of the polarizer plate 22a which faces the collimating plate 28). If this condition is met, the collimated light entering the polarizer plate 22a and any optical compensating film that is optionally inserted in the display panel 12 is also averaged to eliminate any unevenness in the quantity of the collimated light and, as a result, uneven display is prevented in a more efficient and positive way to enable the display of an image of even higher quality.

The collimated light emerging from the collimating plate 28 continues to travel with the same divergence angle of θ as it passes through the display panel 12. The glass substrate 18b and the polarizer plate 22b are provided between the liquid-crystal layer 20 and the light diffusing plate 16; in addition, an optical compensating film such as a phase compensating film may optionally be inserted. Hence, with the conventional LCD, beams of the collimated light that bear images of different pixels overlap each other when they enter the light diffusing plate 16 and diffusion subsequently takes place. As a result, a blurred image will form in the conventional LCD which uses collimated backlight.

According to the study of the present inventors, if beams of the collimated light that bear images of neighboring pixels do not overlap by an amount exceeding one half the pixel size A (see FIG. 4B), the deterioration in image quality due to blurring can be substantially reduced.

In the present invention, the collimated light, display panel 12 and light diffusing plate 16 satisfy the relation d×tan θ≦A and given this design, a high-quality image can be displayed without any blur.

Take, for example, the case where the glass substrate 18b is 0.7 mm thick and the polarizer plate 22b is 0.2 mm thick. Since the distance d from the liquid-crystal layer 20 to the light diffusing plate 16 is 0.9 mm, a blur-free high-quality image can be produced by adjusting the pixel size A of the display panel 12 to at least 159 μm on the condition that the collimated light has a divergence angle. θ of 10°.

If an optical compensating film 0.2 mm thick is additionally inserted between the polarizer plate 22b and the light diffusing plate 16 (to increase the distance d to 1.1 mm), the pixel size A of the display panel 12 need be at least 194 μm.

Thus, the display apparatus 10 of the invention effectively combines collimated backlight with the light diffusing plate to increase the range of viewing angles while preventing any unevenness in image display and blurred images that would otherwise occur on account of the effort to increase the range of viewing angles. Hence, the display apparatus of the invention can advantageously be used as a medical monitor which is required to display images of high contrast and quality over an increased range of viewing angles.

In the embodiment described above, the collimated light, collimating plate 28 and the liquid-crystal panel 12 satisfy the relation p/tan θ≦L and the collimated light, display panel 12 and the light diffusing plate 16 satisfy the relation d×tan θ≦A. This is not the sole case of the invention and it suffices for the purpose of the invention if either one of those relations is satisfied. In these alternative embodiments, too, one can produce high-quality images that are substantially reduced in unevenness and blur compared to the conventional LCD which combines collimated backlight with the light diffusing plate to increase the range of viewing angles.

While the liquid-crystal display apparatus of the invention has been described above in detail with reference to various embodiments, it should be understood that the invention is by no means limited to the foregoing embodiments alone and various improvements and design modifications may of course be made without departing from the scope and spirit of the invention.

As will be understood from the foregoing description, the liquid-crystal display apparatus of the invention effectively combines collimated backlight with the light diffusing plate to display high-contrast images over a wide range of viewing angles and the displayed images have high quality while effectively reducing any unevenness and blur that would otherwise result from the effort to increase the range of viewing angles.

Consequently, the liquid-crystal display apparatus of the invention is particularly suitable for use as a medical monitor that is required to display high-quality images over a wide range of viewing angles.

What is claimed is:

1. A liquid-crystal display apparatus having a liquid-crystal display panel and a backlight section that uses a collimating plate to have collimated light launched into said liquid-crystal display panel, said apparatus satisfying the following relation:

$$p/\tan \theta \leq L$$

where p is an average pitch of emergence of said collimated light, θ is a divergence angle of said collimated light, and L is a distance from said collimating plate to an interface in a liquid-crystal layer of the liquid-crystal display panel which is directed to the collimating plate.

2. The liquid-crystal display apparatus according to claim 1, wherein said backlight section has not only the collimating plate but also a light source and a lamp housing for accommodating said light source an inner surface of which is covered with a diffuse reflecting layer, and said collimating plate has a lens substrate, a multiple of lenses that are supported on said lens substrate for collimating incident light, a diffuse reflecting layer that is formed over the lens substrate except in light entrance areas that align with an optical axes of said lenses, and a shield layer that is formed over the lens substrate on a side closer to the lenses than said diffuse reflecting layer except in said light entrance areas.

3. The liquid-crystal display apparatus according to claim 1, wherein a pixel size of said liquid-crystal display panel is no more than 200 μm.

4. The liquid-crystal display apparatus according to claim 1, wherein said collimated light has a divergence angle θ of no more than ±10°.

5. The liquid-crystal display apparatus according to claim 1, wherein said liquid-crystal display panel is monochromatic.

6. A liquid-crystal display apparatus having a liquid-crystal display panel, a backlight section that uses a collimating plate to have collimated light launched into said liquid-crystal display panel and a light diffusing plate that diffuses the image-bearing light that has passed through said liquid-crystal display panel, said apparatus satisfying the following relation:

$$d \times \tan \theta \leq A$$

where θ is a divergence angle of said collimated light, d is a distance from the light diffusing plate to an interface in a liquid-crystal layer of said liquid-crystal display panel which is directed to the light diffusing plate, and A is a pixel size of said liquid-crystal display panel.

7. The liquid-crystal display apparatus according to claim 6, wherein said backlight section has not only the collimating plate but also a light source and a lamp housing for accommodating said light source an inner surface of which is covered with a diffuse reflecting layer, and said collimating plate has a lens substrate, a multiple of lenses that are supported on said lens substrate for collimating incident light, a diffuse reflecting layer that is formed over the lens substrate except in light entrance areas that align with an optical axes of said lenses, and a shield layer that is formed over the lens substrate on a side closer to the lenses than said diffuse reflecting layer except in said light entrance areas.

8. The liquid-crystal display apparatus according to claim 6, wherein the pixel size of said liquid-crystal display panel is no more than 200 μm.

9. The liquid-crystal display apparatus according to claim 6, wherein said collimated light has a divergence angle θ of no more than ±10°.

10. The liquid-crystal display apparatus according to claim 6, wherein said liquid-crystal display panel is monochromatic.

11. A liquid-crystal display apparatus having a liquid-crystal display panel, a backlight section that uses a collimating plate to have collimated light launched into said liquid-crystal display panel and a light diffusing plate that diffuses the image-bearing light that has passed through said liquid-crystal display panel, said apparatus satisfying the following relations:

$$p/\tan \theta \leq L$$

$$d \times \tan \theta \leq A$$

where p is an average pitch of emergence of said collimated light, θ is a divergence angle of said collimated light, L is a distance from said collimating plate to an interface in a liquid-crystal layer of the liquid-crystal display panel which is directed to the collimating plate, d is a distance from the light diffusing plate to the interface in the liquid-crystal layer of said liquid-crystal display panel which is directed to the light diffusing plate, and A is a pixel size of said liquid-crystal display panel.

12. The liquid-crystal display apparatus according to claim 11, wherein said backlight section has not only the collimating plate but also a light source and a lamp housing for accommodating said light source an inner surface of which is covered with a diffuse reflecting layer, and said collimating plate has a lens substrate, a multiple of lenses that are supported on said lens substrate for collimating incident light, a diffuse reflecting layer that is formed over the lens substrate except in light entrance areas that align with an optical axes of said lenses, and a shield layer that is formed over the lens substrate on a side closer to the lenses than said diffuse reflecting layer except in said light entrance areas.

13. The liquid-crystal display apparatus according to claim 11, wherein the pixel size of said liquid-crystal display panel is no more than 200 μm.

14. The liquid-crystal display apparatus according to claim 11, wherein said collimated light has a divergence angle θ of no more than ±10°.

15. The liquid-crystal display apparatus according to claim 11, wherein said liquid-crystal display panel is monochromatic.

* * * * *